United States Patent [19]

Capriotti et al.

[11] Patent Number: 5,302,333
[45] Date of Patent: Apr. 12, 1994

[54] PROCESS AND DEVICE FOR THE JUNCTION OF THE ENDS OF AN EDGE GASKET ON A SHEET OF GLASS

[75] Inventors: Luigi Capriotti, San Benedetto del Tronto; Oscar De Lena, Termoli, both of Italy

[73] Assignee: Societa Italiana Vetro - SIV - S.p.A., San Salvo CH, Italy

[21] Appl. No.: 9,634

[22] Filed: Jan. 27, 1993

[30] Foreign Application Priority Data

Jan. 28, 1992 [IT] Italy .............. RM92A000061

[51] Int. Cl.⁵ ............................................. B29C 35/02
[52] U.S. Cl. ................................. 264/177.190; 52/208; 156/108; 156/109; 249/78; 264/252; 264/263; 264/313; 264/334; 264/331.19; 264/347
[58] Field of Search ........ 264/177.1, 252, 261, 264/263, 259, 331.19, 347, 313, 267, 334, 236, 177.19, 177.17; 249/78; 52/208; 156/108

[56] References Cited

U.S. PATENT DOCUMENTS

| | | | |
|---|---|---|---|
| 4,183,778 | 1/1980 | Mesnel | 264/261 |
| 4,198,196 | 4/1980 | Cilderman et al. | 249/78 |
| 4,371,684 | 2/1983 | Quiring et al. | 264/331.19 |
| 4,581,276 | 4/1986 | Kunert et al. | 156/108 |
| 4,590,219 | 5/1986 | Nissen et al. | 264/331.19 |
| 4,964,620 | 10/1990 | Omura et al. | 264/261 |
| 5,057,265 | 10/1991 | Kunert et al. | 264/259 |
| 5,069,849 | 12/1991 | Wain | 264/261 |
| 5,108,526 | 4/1992 | Cornils et al. | 264/177.1 |
| 5,127,193 | 7/1992 | Okada et al. | 264/261 |
| 5,129,807 | 7/1992 | Oriez et al. | 264/252 |

FOREIGN PATENT DOCUMENTS

| | | |
|---|---|---|
| 0354481 | 2/1990 | European Pat. Off. |
| 0421833 | 4/1991 | European Pat. Off. |
| 0503343 | 9/1992 | European Pat. Off. |
| 4123256 | 10/1992 | Fed. Rep. of Germany |

Primary Examiner—Jeffery Thurlow
Attorney, Agent, or Firm—Wenderoth, Lind & Ponack

[57] ABSTRACT

The starting end and the finishing end of a seam extruded onto a sheet of glass, for example a windshield of an automobile, are joined to complete an edge gasket. A separate supplementary mold receives part of the glass containing the ends of the seam, and a compatible polymerizable composition is poured into the mold to complete the gasket.

10 Claims, 2 Drawing Sheets

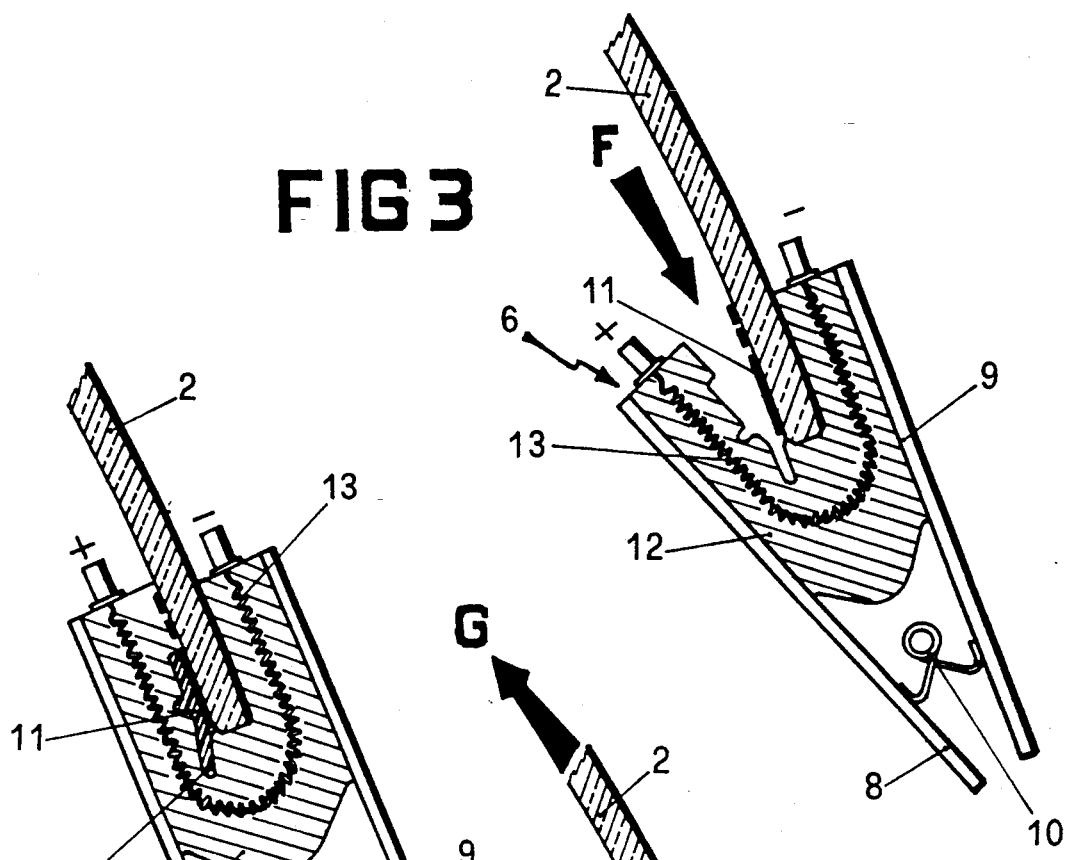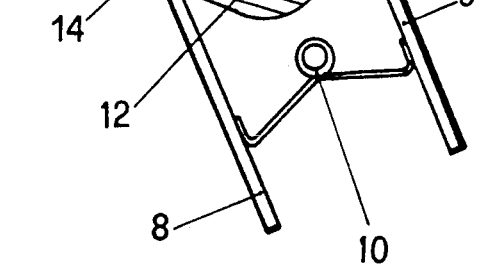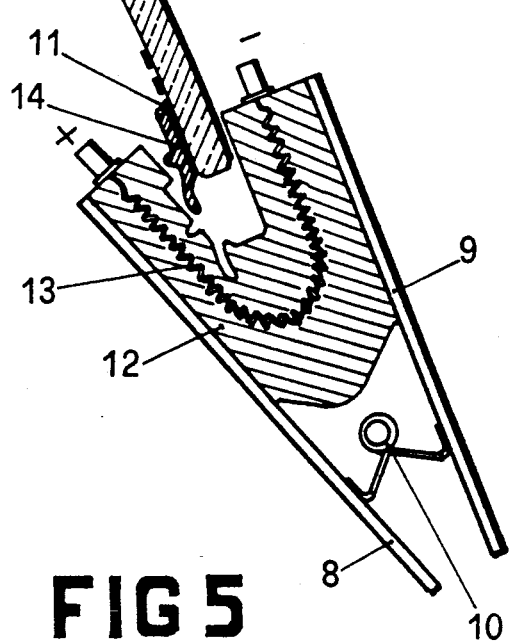

PROCESS AND DEVICE FOR THE JUNCTION OF THE ENDS OF AN EDGE GASKET ON A SHEET OF GLASS

BACKGROUND OF THE INVENTION

1. Field of the Invention

The present invention relates to a process and a device for connecting ends of a seam of extruded plastic material on a sheet of glass, particularly a windshield of an automobile, in which the seam of plastic material forms an edge gasket.

2. Description of the Prior Art

It is known that in order to reduce the cost associated with assembling a windshield to the body of an automobile, a process is used which consists of extruding directly onto the glass a polyurethane seam having a predetermined cross section, the polyurethane being polymerized by environmental humidity so as to form a gasket which adheres to the glass itself.

Assembling the windshield to the body of the automobile is greatly simplified, as it is sufficient to spread an adequate quantity of adhesive on the hardened seam, compatible with the polyurethane used to form the seam itself, and to stick the resulting sheet of glass onto the metal of the body.

In the manufacture of the seam it is necessary to provide the most suitable cross-sectional shape in order to meet requirements of resistance to vibration and sealing against the infiltration of water.

For ease of understanding, the following description will refer to a windshield of an automobile but it is obvious that the present invention can also be applied to any kind of fixed sheet of glass.

During the extrusion of the polyurethane material onto the sheet of glass, a calibrated nozzle is used, through which an amount of plastic material is delivered with pressure which, in correlation with the translational speed of the nozzle itself, defines the shape and thickness of the seam.

The problem to be solved according to the invention is that the seam has to be joined with itself, i.e. it is necessary to connect the starting end, or head, of the seam with the finishing end, or tail, in the best possible manner and using the least possible manpower.

The size of an extrusion nozzle forms a limit to the perfect union of the head and tail of the seam in that at the least a gap equal to the width of the nozzle itself will remain between the head and the tail. Furthermore the seam itself often has a cross section of a complex shape which is difficult to join up.

A typical complex shape is that made up of two sections connected one to the other, in which the first section rests completely against the glass and the second is cantilevered, connected to the first section at its one end only and projecting from the edge of the glass, as a notably elongate portion.

In this case it is difficult to obtain a mechanical connection because of the extrusion of the second projecting part which, due to the flowability of the polyurethane, is unable to maintain its shape during polymerization.

SUMMARY OF THE INVENTION

The object of the present invention is to overcome the above difficulties in carrying out a mechanical manufacture of the connection.

According to the invention, the process of laying down the seam is divided into two steps: in the first step a first portion of the seam is laid down by extruding along nearly the entire edge of the glass, while in the second step a second portion of the seam, which forms the final connection of the entire seam at the part of the edge of the glass without the first portion of seam, is made by a direct molding process carried out on the glass using a specially prepared mold.

There is also a difference between the materials forming the two portions of the seam: the peripheral seam is formed by polyurethane which polymerizes under environmental humidity, whereas that forming the connection is made using a different type of polyurethane, which polymerizes when heated in a relatively short time.

More specifically, the object of the present invention is achieved by providing a process for connecting ends of a seam extruded onto the edge of a sheet of glass in forming the edge gasket of said sheet of glass, in which said seam comprises a first portion in contact with the sheet of glass and a second portion extending above the plane of the glass and projecting out from the first portion, and in which the extrusion of the seam is performed by means of an extrusion device comprising a calibrated nozzle, from which a flow of plastic material is delivered at a given pressure and at a given translation speed of the extruder, the process being characterized by the following steps:

arranging the sheet of glass in a vertical or subvertical position, with the area of the edge of the glass left without seam at the bottom thereof;

applying to this area of the edge of the glass left without seam a mold of elastic plastic material having such a configuration as to accommodate the area of the edge and forming a cavity for formation of the seam in this area, the mold being movable between an open and a closed position;

pouring into the cavity in the mold in its open position a polymerizable polyurethane composition compatible with the seam, and filling the cavity with the composition;

closing the mold immediately after the step of pouring, to impact to the polyurethane material the shape of the seam;

polymerizing the polyurethane material;

opening the mold; and extracting the sheet of glass from the mold.

A further object of the present invention is to provide a mold to be used for carrying out the molding process described above.

A still further object of the present invention is to provide a polyurethane composition which will provide a connection of the ends of the seam having an appearance entirely similar to that of the seam, and which can be poured and polymerized in a satisfactory manner in the context of the overall manufacturing process.

BRIEF DESCRIPTION OF THE DRAWINGS

Further characteristics of the present invention will be more clearly described with reference to the enclosed drawings, in which:

FIG. 3 is a cross-sectional view of the mold prior to a pouring step;

FIG. 4 is a cross-sectional view of the mold prior to the molding step; and

FIG. 5 is a cross-sectional view of the mold during the extraction of the finished product.

DESCRIPTION OF THE PREFERRED EMBODIMENT

Figure 1:
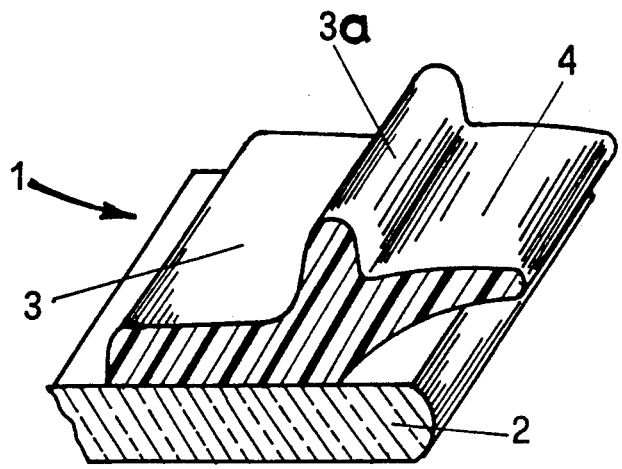
FIG. 1 is a perspective view of a portion of the seam taken in section.
Figure 2:
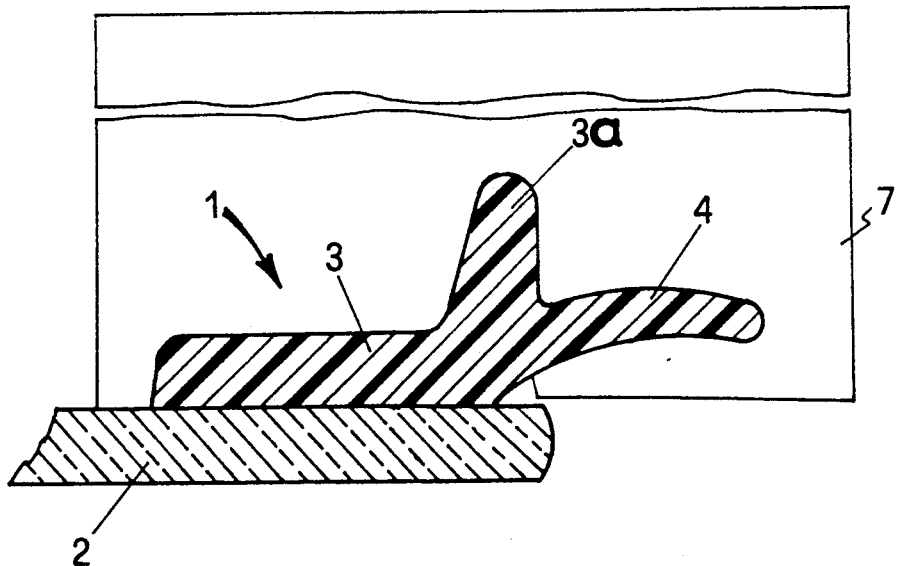
FIG. 2 is a cross-sectional view of the seam also showing a side of the extrusion nozzle.

With reference to FIGS. 1 to 5, the seam 1 is laid on the edge of the sheet of glass 2, and has a cross section including a rectangular part 3, a relief 3a and an elongate part 4 which extends some way beyond the edge of the glass 2 and which projects outward with respect to the part 3.

A calibrated extrusion nozzle travels along the edge of the glass and extrudes onto it the seam 1 having the cross section shown in FIG. 1.

The extrusion nozzle 7 running along the glass 2 creates the seam 1 by extruding polyurethane material through two separate vertical ducts, not shown in the figure, inside the body of the nozzle 7, one of which forms the parts 3 and 3a of the seam 1, while the other forms the part 4.

When the nozzle 7 comes close to the head of the seam, it stops the supply of plastic material and moves away from the sheet of glass, so as to avoid unwanted deposits or flashes. This leaves an area of the edge of the glass without the seam.

Following this, the sheet of glass is placed in a subvertical position by means of a device not shown in the figures, and the part of the edge of the glass left without the seam is inserted into a mold 6.

On the edge of the glass 2 a thin layer of opaque material 11 has been previously laid, having the main job of rendering aesthetically presentable the surface of the sheet of glass onto which the seam is extruded.

The mold 6 is formed by two rigid plates 8 and 9 opposed to each other, and connected by means of an elastic connection, for example a spring 10. This mold has such a width as to cover part of the head and of the tail of the extruded seam, in such a way as to render scarcely visible the difference between the extruded seam and molded seam.

The mold 6 works like a pair of pincers which normally grip the sheet of glass 2 between the two rigid plates 8 and 9, thanks to the pressure of the spring 10.

The part of the two rigid plates 8 and 9 which comes into contact with the edge of the sheet of glass 2 in the area in which the connection of the extruded seam is to take place is provided with an extremely thick coating of silicon rubber which, as shown in FIGS. 3 to 5, forms a single body 12 having on its inside a cavity with a cross section the same as that of the extruded seam, so as to form a mold suitable to create the seam 1.

To make the body 12, the silicon product produced by General Electric and commercially known by the name RTV 664 is preferably used, said product being suitable to form a pouring mold for pourable polyurethane materials.

The thickness of the silicon rubber and its elasticity are chosen in such a way that the single body 12 allows easy opening of the plates 8 and 9 on the sheet of glass 2 by simple manual pressure.

An electric heating element 13 is preferably embedded in the silicon rubber forming the body 12, to provide the mold with the heat necessary to polymerize the poured polyurethane.

The process for performing the connection requires that, immediately after the seam 1 has been extruded onto the edge of the sheet of glass 2, the sheet of glass be inserted, in a subvertical position, into the mold 12, which is held open under the effect of simple manual pressure or in an automatic manner (FIG. 3).

A polyrethane composition compatible with the extruded seam is poured into the body 12 according to the direction of the arrow F. Following this the mold is closed and the heat generated by the heating element 13 harders the poured mixture 14 (FIG. 4).

On completion of the hardening phase, the mold 6 is re-opened and the sheet of glass 2 is removed in the direction of the arrow G, with the connection 14 shaped and hardened and intimately bound to the head and tail of the extruded seam 1 (FIG. 5).

With the above arrangement the following advantages are obtained: an excellent surface finish of the connection; the mold, which closes without bearing openings in the tongue area, prevents the formation of flashes on visible parts of the gasket; the aesthetic appearance of the extruded seam and that of the molded one are almost totally identical.

The above advantages contribute to a notable reduction in manufacturing costs.

A preferred composition of the polyurethane material will now be described for use in the connecting process described above, which and enables pouring and polymerizing times to be obtained compatible with the process as a whole and also resulting in a molded connection which is entirely similar in appearance to that of the extruded gasket.

The polyurethane composition comprises:

A) as the polyole component from 0% to 66% of a polyole having a primary OH number equivalent to about 25 mg KOH/g and having a molecular weight equivalent to about 4000; from 5% to 80% of an amine polyole mixture with OH equivalent to about 92 mg KOH/g; from 0% to 40% of a polyetheric mixture with OH equivalent to about 165 mg KOH/g; from 0% to 25% of a plasticizing agent stable under ultraviolet light, of the type diisodecyladipate; and from 0% to 2% of an organometallic catalyzer; from 0% to 1% of an organometallic catalyzer of the dibutyldilauryl lead type;

B) as the isocyanate component the following isocyanates are used together or separately: 4,4'-diphenylmethane-diisocyanate modified with 23% NCO; isoforon-diisocyanate with 38% NCO; isoforon-diisocyanate polyadduct with 30.5% NCO: the isocyanates being chosen in such a way that the ratio of NCO:OH will be between 1.01 and 1.1.

By varying of the percentages of the polyole and type or types of isocyanate, composition can be obtained having similar final characteristics but with substantial differences with regard to the necessary pouring time, demoulding time, processing temperature.

The features of the present invention will be more clearly illustrated in the following examples of of the composition.

EXAMPLE 1

100 g of a polyole mixture produced by the company BAYER and known as VP PU 0784A, having a number of OH equal to approximately 92, are mixed with: 20 g of a polyether produced by the company HULS and known as Lab A 2499, having a number of OH equal to approximately 156; 40 g of a low viscosity plasticizing agent stable under UV, of the type diisodecyladipate; 3 g of an organometallic catalyzer of the type Thorcat 535 produced by the company THOR CHEMICAL; and 1 g of dibutyldilauryl lead.

After thorough stirring, the following are added rapidly to the compound: 10.2 g of Desmodur VP PU 0743 produced by the company BAYER with a percentage of NCO of 23% and 23.8 g of a polyadduct of IPDI produced by the company HULS and known as Lab B 2499 containing 30.8% NCO. Amounts of the isocyanate described above are used to obtain an NCO index equal to 1.05.

The thus obtained mixture has a flow time at 23° C. of approximately 35-40 seconds, a delivery time at 90° C. of 15' and a Shore A hardness of the hardened product equivalent to 66 units.

EXAMPLE 2

The following are intimately mixed together: 2 g of a 92% OH polyole produced by BAYER and known as VP PU 0784A; 10 g of a polyether mixture produced by HULS and known as Lab A 2499 containing 155.7% OH; 5 g of Tecnothane 1371 with an OH percent equivalent to 25; 1.5 g of diisodecyladipate; and 0.2 g of Thorcat 535.

There are then added 6.5 g of an MDI produced by BAYER of the type Desmodur VP PU 0743 with 23% NCO so as to obtain an NCO index equal to 1.03, and the mixture is rapidly poured into the mold (the flow time at 23° C. is approximately 40"). After 15' at 40° C. a material is delivered which, on completion of the reaction, has a shore hardness of 56 units.

EXAMPLE 3

15 g of Tecnothane 1371 with a % OH equal to approximately 25 and 5 parts of a polyole formulated by the company BAYER and known as VP PU 0784A with OH equal to 92 are mixed, and to this mixture are added 2.9 g of Desmodur BAYER VP PU 0743 at 23% NCO (the NCO index will be equal to 1.08). For this mixture the flow time is approximately 30" at 23° C., the delivery time is 5' at 40° C. and the final hardness is approximately 60 Shore A units.

EXAMPLE 4

The following are mixed: 10 g of BAYFLEX VP PU 0784A; 1.3 parts of diisoldecyladipate; 0.25 g of Thorcat 535; 0.08 g of dibutyldilauryl lead; and 1.9 parts of IPDI (manufactured by HULS) at 38% NCO.

This composition has a flow time of approximately 2 minutes, a delivery time of 7' at 120° C. and a Shore hardness of 70 units.

We claim:

1. A process of completing the formation of a gasket of a sheet of glass, the sheet of glass having a seam constituting a portion of the gasket and extending along only part of an edge of the sheet, said method comprising:

orienting the sheet of glass in a vertical or nearly vertical position with an area of the sheet that includes a part of said edge without the seam being located at a lowermost position;

positioning the sheet of glass in a mold, including a body of elastic plastic material configured to accommodate said area of the sheet and having a cavity therein of a cross-sectional shape corresponding to that of said seam, with said area of the sheet so accommodated in the body of elastic plastic material, the mold being movable between an open position at which the cavity is exposed and a closed position at which the cavity is aligned with the seam when the sheet of glass is accommodated in the body of elastic plastic material;

while the mold is in the open position thereof and the sheet is oriented in the vertical or nearly vertical position, pouring a polymerizable polyurethane composition compatible with material of the seam into the mold in an amount sufficient to fill the cavity with the composition;

moving the mold to the closed position thereof after the polyurethane composition has been poured into the mold whereupon the polyurethane composition in the cavity assumes a shape corresponding to that of the seam;

polymerizing the polyurethane composition disposed in the cavity;

moving the mold to the open position thereof after the composition has been polymerized; and subsequently extracting the sheet of glass from the mold.

2. A process of completing the formation of a gasket of a sheet of glass as claimed in claim 1, wherein the moving of the mold to the closed position thereof includes allowing the mold to close under a force exerted by a resilient member, and the moving of the mold to the open position thereof includes applying a force to the mold in a direction opposite to that in which the force exerted by the resilient member acts on the mold.

3. A process of completing the formation of a gasket of a sheet of glass as claimed in claim 1, wherein the polyurethane composition comprises a polyole component including from 0% to 66% of a polyole having a primary OH number equivalent to about 25 mg KOH/g and having a molecular weight equivalent to about 4000, from 5% to 80% of an amine/polyole mixture with an OH number equivalent to about 92 mg KOH/g, from 0% to 40% of a polyetheric mixture with an OH number equivalent to about 165 mg KOH/g, from 0% to 25% of a plasticizing agent stable under ultra-violet light and of a diisodecyladipate type, from 0% to 2% of an organometallic catalyzer, and from 0% to 1% of an organometallic catalyzer of a dibutyldilauryl lead type, and an isocyanate component including 4,4'-diphenylmethane-diisocyanate modified with 23% NCO, isoforondiisocyanate modified with 38% NCO, and a polyadduct of isoforondiisocyanate modified with 30.5% NCO.

4. A process of completing the formation of a gasket of a sheet of glass as claimed in claim 3, wherein a ratio of the NCO to the OH in the composition is from 1.01 to 1.1.

5. A process of completing the formation of a gasket of a sheet of glass as claimed in claim 1, wherein said polymerizing of the polyurethane composition comprises heating the composition in the cavity with a heating element embedded in the elastic plastic material.

6. A method of forming a gasket along an edge of a sheet of glass, said method comprising:

extruding a seam along only a portion of the edge of the sheet of glass by delivering a polymeric material under pressure from a nozzle of an extrusion device, calibrated to impart to the seam a cross-sectional shape including a first portion contacting the sheet of glass and a second portion projecting outwardly from the first portion to a position above a plane in which the sheet of glass lies, by moving the nozzle along the edge of the glass at a predetermined speed, and by terminating the delivery of plastic material once the nozzle is adjacent a first-formed head end of the seam so as to leave a second-formed tail end of the seam opposing and spaced from the head end;

allowing the seam to polymerize in situ;

orienting the sheet of glass in a vertical or nearly vertical position with the opposed ends of the seam located at a lowermost position;

positioning the sheet of glass in a mold, including a body of elastic plastic material configured to accommodate a portion of the sheet of glass at which the ends of the seam are located and having a cavity therein of a cross-sectional shape corresponding to that of said seam, with said portion of the sheet so accommodated in the body of elastic plastic material, the mold being movable between an open position at which the cavity is exposed and a closed position at which the cavity extends between the ends of the seam when said portion of the sheet of glass is accommodated in the body of elastic material;

while the mold is in the open position thereof and the sheet is oriented in the vertical or nearly vertical position, pouring a polymerizable polyurethane composition compatible with material of the seam into the mold in an amount sufficient to fill the cavity with the composition;

moving the mold to the closed position thereof after the polyurethane composition has been poured into the mold whereupon the polyurethane composition in the cavity assumes a shape corresponding to that of the seam;

polymerizing the polyurethane composition disposed in the cavity;

moving the mold to the open position thereof after the composition has been polymerized; and subsequently extracting the sheet of glass from the mold.

7. A method of forming a gasket along an edge of a sheet of glass as claimed in claim 6, wherein the moving of the mold to the closed position thereof includes allowing the mold to close under a force exerted by a resilient member, and the moving of the mold to the open position thereof includes applying a force to the mold in a direction opposite to that in which the force exerted by the resilient member acts on the mold.

8. A method of forming a gasket along an edge of a sheet of glass as claimed in claim 6, wherein the polyurethane composition comprises a polyole component including from 0% to 66% of a polyole having a primary OH number equivalent to about 25 mg KOH/g and having a molecular weight equivalent to about 4000, from 5% to 80% of an amine/polyole mixture with an OH number equivalent to about 92 mg KOH/g, from 0% to 40% of a polyetheric mixture with an OH number equivalent to about 165 mg KOH/g, from 0% to 25% of a plasticizing agent stable under ultraviolet light and of a diisodecyladipate type, from 0% to 2% of an organometallic catalyzer and from 0% to 1% of an organometallic catalyzer of a dibutyldilauryl lead type, and an isocyanate component including 4,4'-diphenylmethane-diisocyanate modified with 23% NCO, isoforondiisocyanate modified with 38% NCO, and a polyadduct of isoforondiisocyanate modified with 30.5% NCO.

9. A process of completing the formation of a gasket of a sheet of glass as claimed in claim 8, wherein a ratio of the NCO to the OH in the composition is from 1.01 to 1.1.

10. A process of completing the formation of a gasket of a sheet of glass as claimed in claim 6, wherein said polymerizing of the polyurethane composition comprises heating the composition in the cavity with a heating element embedded in the elastic plastic material.

* * * * *